US008874149B2

(12) United States Patent
Mikan et al.

(10) Patent No.: US 8,874,149 B2
(45) Date of Patent: *Oct. 28, 2014

(54) SYSTEM AND METHOD FOR DETERMINING AN SMS MESSAGE RETRANSMISSION SCHEDULE

(71) Applicant: AT&T Mobility II LLC, Atlanta, GA (US)

(72) Inventors: Jeffrey Clinton Mikan, Atlanta, GA (US); Charles M. Link, Atlanta, GA (US); John Lewis, Lawrenceville, GA (US); John Bonning, Norcross, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/920,112

(22) Filed: Jun. 18, 2013

(65) Prior Publication Data

US 2013/0281136 A1  Oct. 24, 2013

Related U.S. Application Data

(63) Continuation of application No. 13/551,711, filed on Jul. 18, 2012, now Pat. No. 8,478,315, which is a continuation of application No. 11/947,540, filed on Nov. 29, 2007, now Pat. No. 8,254,971.

(51) Int. Cl.
*H04W 4/14* (2009.01)
*H04L 1/18* (2006.01)
*H04L 29/14* (2006.01)
*H04L 12/58* (2006.01)
*H04L 29/08* (2006.01)

(52) U.S. Cl.
CPC .............. *H04W 4/14* (2013.01); *H04L 1/1887* (2013.01); *H04L 51/38* (2013.01); *H04L 51/30* (2013.01); *H04L 67/325* (2013.01); *H04L 69/40* (2013.01)
USPC .......................................... 455/466; 714/748

(58) Field of Classification Search
USPC ........... 455/466; 714/748–750; 709/206–225; 379/201–211; 370/328–349
See application file for complete search history.

(56) References Cited

U.S. PATENT DOCUMENTS

| 4,860,292 | A  | * | 8/1989 | Newman et al. ............... | 714/748 |
| 6,175,859 | B1 | * | 1/2001 | Mohler ......................... | 709/206 |
| 6,269,080 | B1 | * | 7/2001 | Kumar .......................... | 370/236 |
| 6,311,186 | B1 | * | 10/2001 | MeLampy et al. ............. | 1/1 |
| 6,330,451 | B1 | * | 12/2001 | Sen et al. ................... | 455/452.2 |
| 7,673,211 | B2 | * | 3/2010 | Meyer et al. ................ | 714/748 |
| 2004/0123210 | A1 | * | 6/2004 | Baudry et al. ............... | 714/748 |
| 2005/0169180 | A1 | * | 8/2005 | Ludwig ......................... | 370/231 |
| 2005/0213505 | A1 | * | 9/2005 | Iochi et al. .................... | 370/236 |

(Continued)

*Primary Examiner* — Kashif Siddiqui
(74) *Attorney, Agent, or Firm* — Parks IP Law LLC; Mickki D. Murray, Esq.

(57) ABSTRACT

A system and method for determining an SMS retransmission schedule is provided. When a special error code is received by an SMSC, the SMSC can calculate the response time. The response time is the time that lapsed between forwarding the SMS message for delivery and receiving an error code. If the response time exceeds a response time threshold, the error code can be considered as falsely generated, A special retransmission schedule can be assigned to the SMS message. If the response time does not exceed a response time threshold, a different retransmission schedule can be assigned to the SMS message.

20 Claims, 3 Drawing Sheets

(56) References Cited

U.S. PATENT DOCUMENTS

2006/0268801 A1* 11/2006 Morita ........................ 370/338
2006/0271680 A1* 11/2006 Shalev et al. ................. 709/225
2007/0191035 A1* 8/2007 Huggett ....................... 455/466

* cited by examiner

SYSTEM AND METHOD FOR DETERMINING AN SMS MESSAGE RETRANSMISSION SCHEDULE

TECHNICAL FIELD

The present invention relates generally to the field of short message service management. More particularly, the present invention relates to a system and method for determining a short message service (SMS) message retransmission schedule.

BACKGROUND

Short Message Service (SMS) is a protocol used for the transmission of short text messages from a first short message entity (SME), e.g., a mobile phone, a fax machine, a personal computer, and the like, to a second SME. Individual short message are limited to no more than 160 alphanumeric characters if using a Latin alphabet, or no more than 70 characters if using non-Latin characters such as Hebrew or Chinese. SMS-based services have become extremely popular, with the number of messages sent per month measured in the tens of billions.

After an SMS message is sent from a first SME, it is received by a Short Message Service Center (SMSC). The SMSC can be hardware, software, or a combination thereof that resides on a telecommunications network. The SMSC manages the so-called "store and forward" processes required to pass an SMS message from a first SME to a second SME (designated SME).

Once the SMSC receives the message from a first SME, the SMSC can direct the SMS message to the designated SME, or a group of designated SMEs. To properly direct an SMS message sent to a designated SME, the SMSC can query the home location register (HLR) to find status and location information for the designated SMEs. Once the HLR receives the request, it can respond to the SMSC with the designated SME status as either active or inactive, and the current location of the designated SME. If the HLR response is 'inactive', then the SMSC can assign a retransmission schedule to the SMS message. For example, the SMSC can store the SMS message for a period of time. While the SMSC stores the message, the HLR can periodically check the subscriber status and location according to a preset routine, the SMSC can periodically query the HLR for the subscriber status and location, or the HLR can wait for the subscriber to access his device or otherwise become visible to the network. Once the subscriber is visible, the HLR can send an SMS Notification to the SMSC, and the SMSC can attempt delivery of the SMS message to the subscriber's SME.

When the SMSC is ready to attempt delivery of the SMS message, the SMSC transfers the message in a Short Message Delivery Point-to-Point format to the serving system. The system pages the desired second SME, and if it responds, the SMS message can be delivered. After the SMS message is successfully delivered, the SMSC can receive verification that the message was received. The SMSC can categorize the SMS message as 'sent' and generally will not attempt to send the SMS message again. If, however, the SMS message is not delivered, then the SMSC can receive an error code. In such a case, the SMSC can store the SMS message again and a retransmission schedule can be assigned to the SMS message.

SMS messages sent to an SME may not be delivered for a number of reasons. Two common reasons for undelivered SMS messages are an absent subscriber and that the mobile memory capacity has been exceeded.

In the case of a genuine "absent subscriber" error code, an SME may be switched off or temporarily out of coverage. If the SMSC tries to deliver a message to an SME while either of these conditions exists, an "absent subscriber" error code can be generated. The SMSC can store the SMS message and reattempt delivery according to an appropriate retransmission schedule. An "absent subscriber" retransmission schedule can allow for a number of retransmission attempts in case the SME has temporarily gone out of coverage (e.g. into a tunnel). If the SME again becomes available, e.g., the SME is powered on, changes cells, receives or makes a voice call, sends a short message, the mobile phones periodic location update timer expires, or the like, then the SMSC can be informed and the message waiting in the SMSC can be forwarded for delivery to the SME.

It should be noted that when an SME becomes temporarily unavailable and becomes available again in the same cell the HLR will not necessarily receive any notification, or pass any such notification to the SMSC, that the SME has become available unless, for example, the SME is powered on (typically after being powered down), changes cells, receives or makes a voice call, sends a short message, the SME periodic location update timer expires, or the like. This, i.e., in case an SME became temporarily unavailable and available again in the same cell, is one reason that an SMSC can assign retransmission schedule to an undelivered SMS message.

As with other error codes, the SMSC can receive an "absent subscriber" error code even though the device is turned on and currently registered on the network. It has been noted, for example, that some devices can generate an "absent subscriber" error code if the device is running a data session, for example, actively setting up a PDP or transferring on that context, when delivery of the SMS message is attempted. Other error codes can also be falsely generated. In such cases, the falsely generated error code will induce the SMSC to assign a standard retransmission schedule to the undelivered SMS message, though the SME is ready to receive the SMS message immediately.

Retransmission schedules can vary according to the error code received. In the case of a "memory capacity exceeded" error, for example, the SMSC can continually attempt retransmission of the SMS message with gradually lengthening intervals. The retransmission attempts can continue for the validity period of the message. Some other error codes can induce the SMSC to purge the SMS message and forego attempted redelivery.

There are other causes of failed SMS message delivery. These less common errors encountered, e.g. "unidentified subscriber," are subject to different retransmission schedules according to the error condition and can also be falsely generated.

SUMMARY

A system and method for determining an SMS retransmission schedule is provided. A special error code is defined by a user, a network operator, software, or by any other authorized party, and an SMSC is configured to recognize the special error code. An SMS message is sent to a subscriber's device. If an error code is received by the SMSC, the SMSC can first determine if the error code is a special error code, i.e., an error code that has a tendency to be falsely reported. If the error code is special, the SMSC can calculate the response time, i.e., the time it took between attempting delivery to the subscriber's device and receiving the error code at the SMSC.

Once the response time is calculated, the response time can be compared to a response time threshold. If the response time exceeds a maximum response time threshold, then the SMSC may classify the error code as a falsely generated error code. In other circumstances, a response time that is less than a minimum response time threshold can prompt the SMSC to determine that the error code is a falsely generated error code. If the error code is not a special error code, or if the error code is special, but the response time is substantially as expected, then a first retransmission schedule can be assigned to the returned SMS message. If the error code is a special error code, and the response time is more or less than a maximum or minimum response time, respectively, then a second retransmission schedule can be assigned to the returned SMS message.

The first retransmission schedule can, but need not, differ completely from the second retransmission in any number of ways. For purposes of illustration only, a first retransmission schedule can specify that the returned SMS message should be stored, and that retransmission should be attempted every 15 minutes for a maximum of 5 times. Meanwhile, a second retransmission schedule may specify that the returned SMS message should be stored, and that retransmission should be attempted every 20 seconds until a different error code is returned, or until 50 attempts have been made. Alternatively, the second retransmission schedule can specify certain hardware or software to avoid on the network, or the like. These examples are illustrative only, and used only to show that numerous and varied changes can be made to the retransmission schedules as desired.

The response time threshold can be determined by a user, a network operator, software, or any other authorized party. For purposes of illustration only, a response time threshold may be set at 5 seconds. In such a case, the SMSC can recognize a special error code as a falsely generated error code when it is received any more than 5 seconds after attempting to deliver the SMS message. Alternatively, the threshold value can be set as a minimum value, and a special error code that is received any sooner than the minimum threshold can be recognized as a falsely generated error code. The response time threshold can be set at any value as determined by an authorized party.

Accordingly, an embodiment of the present invention includes a method for determining a short message service (SMS) retransmission schedule for an SMS message. After an SMS message is forwarded from a node on a telecommunications network to a device, the node can receive an error code relating to the forwarded SMS message. If an error code is received by the node, then the node determines a retransmission schedule for the SMS message based upon the error code received by the node. The node determines whether the error code received by the node is a special error code. If the error code is not a special error code, then the node assigns a first retransmission schedule to the SMS message. If the error code is a special error code, then the time period that lapsed from when the SMS message was forwarded to the device until the error code was received at the node is calculated. If the calculated time period is greater than a response time threshold, a second retransmission schedule is assigned to the SMS message. If the calculated time period is not greater than a response time threshold, the first retransmission schedule is assigned to the SMS message.

According to another aspect, the response time threshold is at least one hundredth of a second. According to another aspect, the response time threshold is at least one second.

According to another aspect, the response time threshold is at least three seconds.

According to another aspect, the response time threshold is at least five seconds.

According to another aspect, the response time threshold is at least ten seconds.

According to another aspect, the node is a short message service center (SMSC).

According to another aspect, the device is a mobile communications device.

According to another aspect an SMSC node is configured to perform the steps of the method.

According to another aspect, a computer-readable medium includes computer-executable instructions that, when executed, perform the steps of the method.

According to another embodiment, the present invention includes a telecommunications network that includes a short message service center (SMSC) node configured to determine a short message service (SMS) retransmission schedule for an undelivered SMS message. If an SMS message is undeliverable due to an error, then the SMSC node receives an error code relating to the attempted delivery of an SMS message. The SMSC node determines a retransmission schedule for the SMS message based on the received error code. If the error code received by the SMSC node is not a special error code, a first retransmission schedule is assigned to the SMS message. If the error code received by the SMSC node is a special error code, then the time period that lapsed from when the SMS message was forwarded to the device until the error code was received at the SMSC node is calculated. If the calculated time period is greater than a response time threshold, a second retransmission schedule is assigned to the SMS message. If the calculated time period is not greater than a response time threshold, the first retransmission schedule is assigned to the SMS message.

According to another aspect, the response time threshold is at least one hundredth of a second.

According to another aspect, the response time threshold is at least one second.

According to another aspect, the response time threshold is at least three seconds.

According to another aspect, the response time threshold is at least five seconds.

According to another aspect, the response time threshold is at least ten seconds.

According to another aspect, the device is a mobile communications device.

According to another aspect, the SMSC node is software residing on a telecommunications network hardware component.

These and further features of the present invention will be apparent with reference to the following description and attached drawings.

DESCRIPTION

Figure 1:
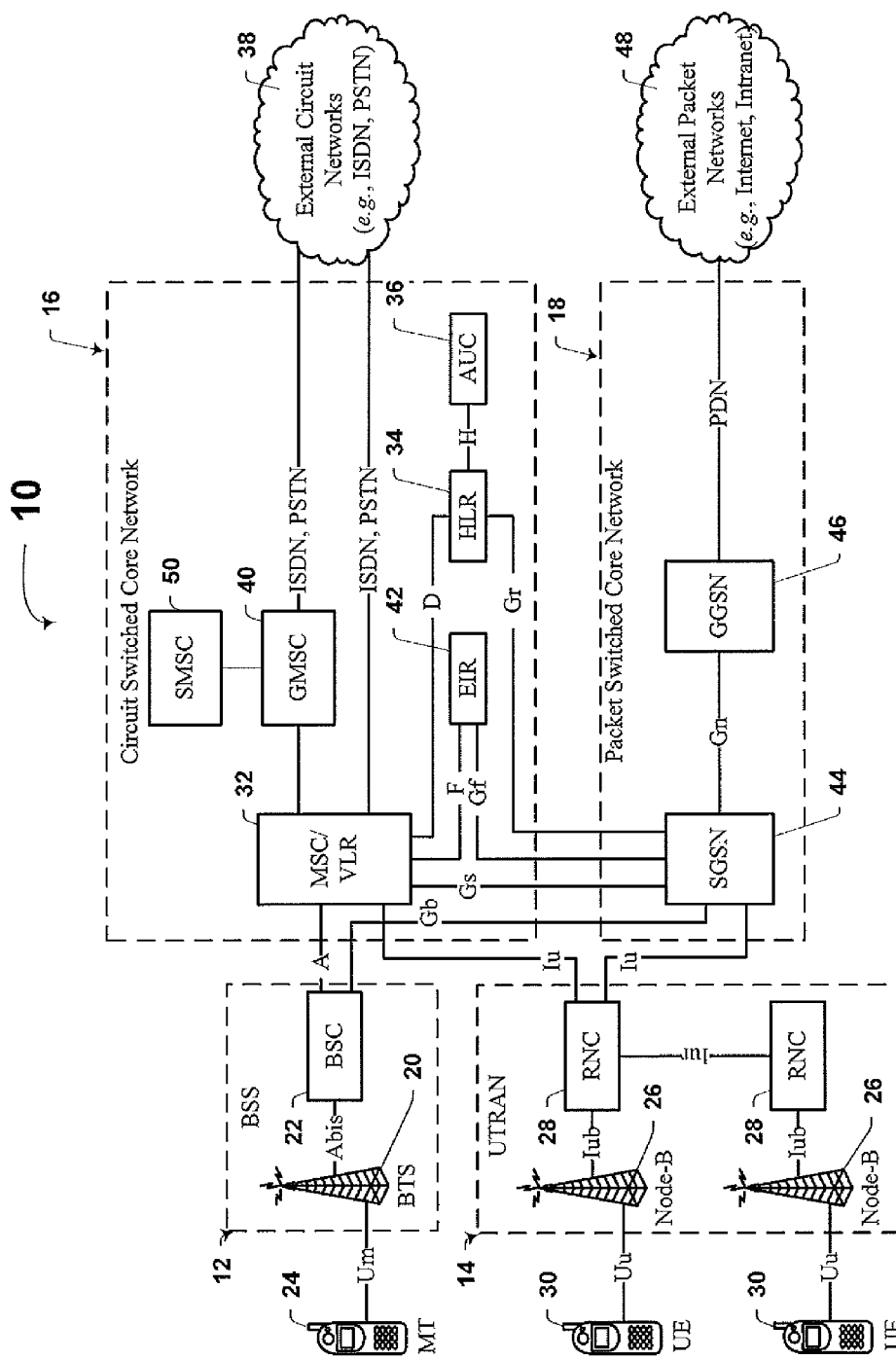
FIG. 1 is a schematic diagram of an exemplary telecommunications network.

As required, detailed embodiments of the present invention are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention. Referring initially to FIG. 1, an exemplary telecommunications network 10 in which the present invention can be employed is illustrated. The telecommunications network 10 illustrates elements of both a GSM and UMTS network. As such, radio access networks (RANs) are illustrated as a base station subsystem (BSS) 12 for a GSM network and a UTRAN 14 for a UMTS network. The RANs 12, 14 are in communication with a circuit switched core network 16 and a packet switched core network 18 via respective interfaces A, Gb, and Iu. Basic elements of these networks are described as reference for the reader and to illustrate an exemplary environment in which the present invention may be practiced. It should be understood, however, that the present invention is not limited to a GSM and/or UMTS network and may be alternatively be practiced in other network types, for example, code division multiple access (CDMA), CDM92000, variations thereof, and the like.

The illustrated BSS 12 can include one or more base transceiver stations (BTS) 20 in communication with a base station controller (BSC) 22 via an A-bis interface. Although not illustrated, a packet control unit (PCU) can be implemented within the BSC 22 or in communication with the BSC 22 to facilitate packet-based communication between the BSC 22 and the packet switched core network 18. The BTS 20 and accompanying BTSs (not shown) communicate with a mobile terminal 24 via a Um air interface.

The illustrated UTRAN 14 can include one or more Node-B elements 26. A node-B is the logical equivalent of a GSM BTS 20 for a UMTS network. Each node-B 26 is in communication with a radio network controller (RNC) 28 via an Iub interface. The RNCs 28 can communicate with one another via an Iur interface. The node-B elements 26 communicate with user equipment (UE) 30 via a Uu air interface.

The illustrated circuit switched core network 16 includes a mobile switching center (MSC) and visited location register (VLR) 32 that is in communication with the BSC 22 and RNC 28 via the A and Iu interfaces, respectively. The MSCNLR 32 routes all incoming and outgoing calls to and from wireline and wireless networks. For example, when a user wants to make an outgoing call, the VLR portion of the MSCNLR 32 determines whether the caller is actually authorized to make the call. In certain instances, such as international dialing, for example, a message barring the user from making the call may be generated by the VLR portion of the MSCNLR 32, and sent to the user's MT 24 or UE 30.

The MSCNLR 32 is in communication with a home location register (HLR) 34 via a D interface. The HLR 34 provides the administrative information required to authenticate, register, and route calls for network subscribers.

The HLR 34 is illustrated as being in communication with an authentication center (AuC) 36 via an H interface. It should be understood, however, that the AuC 36 may be embodied within the HLR 34.

The MSCNLR 32 is also in communication with one or more external circuit networks 38 directly or via a gateway GMSC 40, and an equipment identity register (EIR) 42 via an F interface. The EIR 42 is in communication with the MSCNLR 32 via an F interface and is serving a GPRS support node (SGSN) 44 via a Gf interface. The HLR 34 and MSCNLR 32 are each in communication with the SGSN via respective interfaces Gr and Gs. The SGSN 44 tracks the location of an MT 104 or a UE 30, and performs security functions and access control. The SGSN 44 is in communication with a gateway GPRS support node (GGSN) 46 via a Gn interface. The GGSN 46 supports the edge routing function of the GPRS core network 18 to external packet networks 48 (e.g., Internet, Intranet) via a PDN interface. The GGSN 46 can include firewall and filtering functionality to protect the integrity of the GPRS core network 18. The GGSN 46 can also be in communication with a billing system (not shown).

Figure 2:
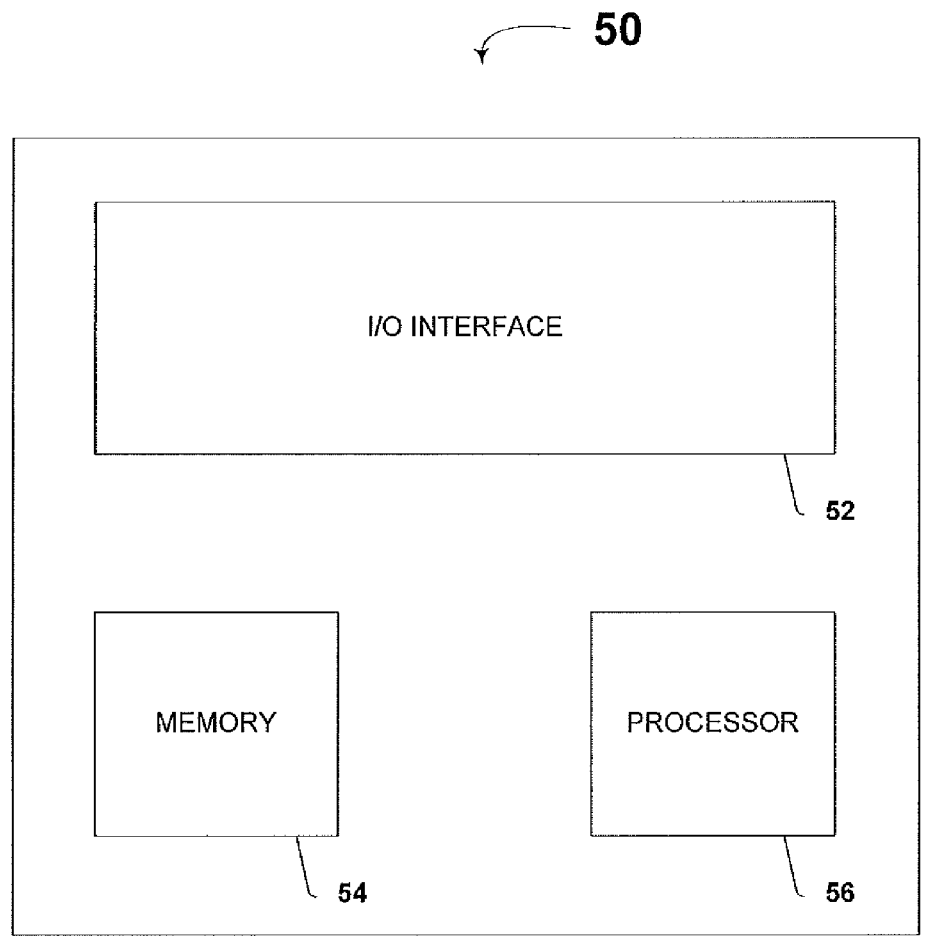
FIG. 2 is a schematic diagram of an exemplary short message service center (SMSC) of an exemplary telecommunications network.

The network also includes one or more short message service centers (SMSC) 50. An exemplary SMSC 50 is schematically illustrated in FIG. 2 and described in more detail, infra. Other elements, such as multimedia message service centers (MMSC), signaling networks (e.g., SS7), advanced multimedia networks (e.g., an IP multimedia subsystem), and the like are not illustrated, but are contemplated and can be included where applicable.

Referring additionally to FIG. 2, an exemplary SMSC 50 is schematically illustrated. As shown in FIG. 2, an SMSC can include an I/O interface 52, a memory 54, and a processor 56. It should be understood, however, that the SMSC can be software only. In such a case, the I/O interface 52, the memory 54, and/or the processor 56, can reside elsewhere on the network 10 and can be used by the SMSC 50 when needed.

Referring now to FIGS. 1 and 2, an exemplary process for sending an SMS message through an exemplary network can be understood. For purposes of providing a more complete description, the process will be illustrated and described with an SMS message sent from a device on an external packet network 48, e.g., a personal computer on the internet, to a mobile telephone 24. It should be understood, however, that SMS messages can be sent to and from any desired devices that support SMS messaging. Therefore, this example should be understood only as illustrative, and not as limiting in any way.

When an SMS message is sent, the SMS message is usually relayed to an SMSC 50. In the case of a personal computer connected to an SMS service on an external packet network 48, the SMS message can first pass through multiple networks, including, but not limited to, a packet switched network 18. The message can be relayed by any number of devices, for example, a GGSN 46, an SGSN 44, a combination thereof, or the like. The SMS message can be routed to an MSCNLR 32 of a circuit switched core network 16. The message can be routed from the MSCNLR 32 to the SMSC 50. While the SMSC 50 is illustrated as connected to the GMSC 40, the SMSC 50 can be connected to, or reside on, the MSCNLR 32 or another network device. As such, the illustrated arrangement is exemplary only.

Once the SMSC 50 receives the SMS message, the SMSC 50 will store the SMS message, for example, in a memory 54. The SMSC can query the HLR 34 as to the status and location of the desired recipient device, in this example, a mobile telephone 24.

If the desired recipient device, the mobile telephone 24, is active, the HLR 34 can inform the SMSC 50 that the mobile telephone 24 is turned on, and the current location of the mobile telephone 24. If the mobile telephone 24 is currently powered down, out of the service area, or otherwise not available, the HLR 34 can inform the SMSC 50 that the mobile telephone 24 is inactive. The SMSC 50 can store the message and implement a retransmission schedule.

The retransmission schedule may designate any desired schedule for making future delivery attempts. For example, the SMS message can be stored in an SMSC memory 54, and the SMSC 50 can query the HLR 34 every 2 minutes, for example, until the HLR 34 replies with a location for the mobile telephone 24. Alternatively, the HLR 34 can inform the SMSC 50 when the mobile telephone 24 again becomes visible to the HLR 34. This would obviate the need for the SMSC 50 to query the HLR 34 according to a schedule. Instead, the HLR 34 can recognize the mobile telephone 24 when an event occurs, such as, but not limited to, registering the mobile telephone 24 with the network 10, making or receiving calls on the mobile telephone 24, the mobile telephone 24 traveling into a different network, or the like. Furthermore, it should be understood that the HLR 34 can communicate with other network hardware or software, such as, but not limited to, an MSCNLR 32, a BSC 22, a BTS 20, or the like, to determine when the mobile telephone 24 is available.

The SMSC memory 54 can continue storing the SMS message until the designated recipient of the SMS message becomes available or until some designated time expires. If a time limit set for delivery of the SMS message expires, then the SMSC 50 can purge the SMS message prior to delivery. If the SMSC 50 stores the message for redelivery, then once the designated recipient of the message becomes available, the SMSC 50 can forward the SMS message to the mobile telephone 24. In the case of a mobile telephone 24, the SMS message can pass through other network software and/or hardware, for example, an MSCNLR 32, a BSC 22, a BTS 20.

If the mobile telephone 24 receives the SMS message, the SMSC 50 can receive a notification that the message was successfully delivered. If the mobile telephone 24 cannot accept the message, then an error code can be sent to the SMSC 50. In such a case, the SMSC 50 can purge the message or store the message again. If the SMSC 50 stores the message, the SMSC 50 may assign an appropriate retransmission schedule based on the error code received.

Figure 3:
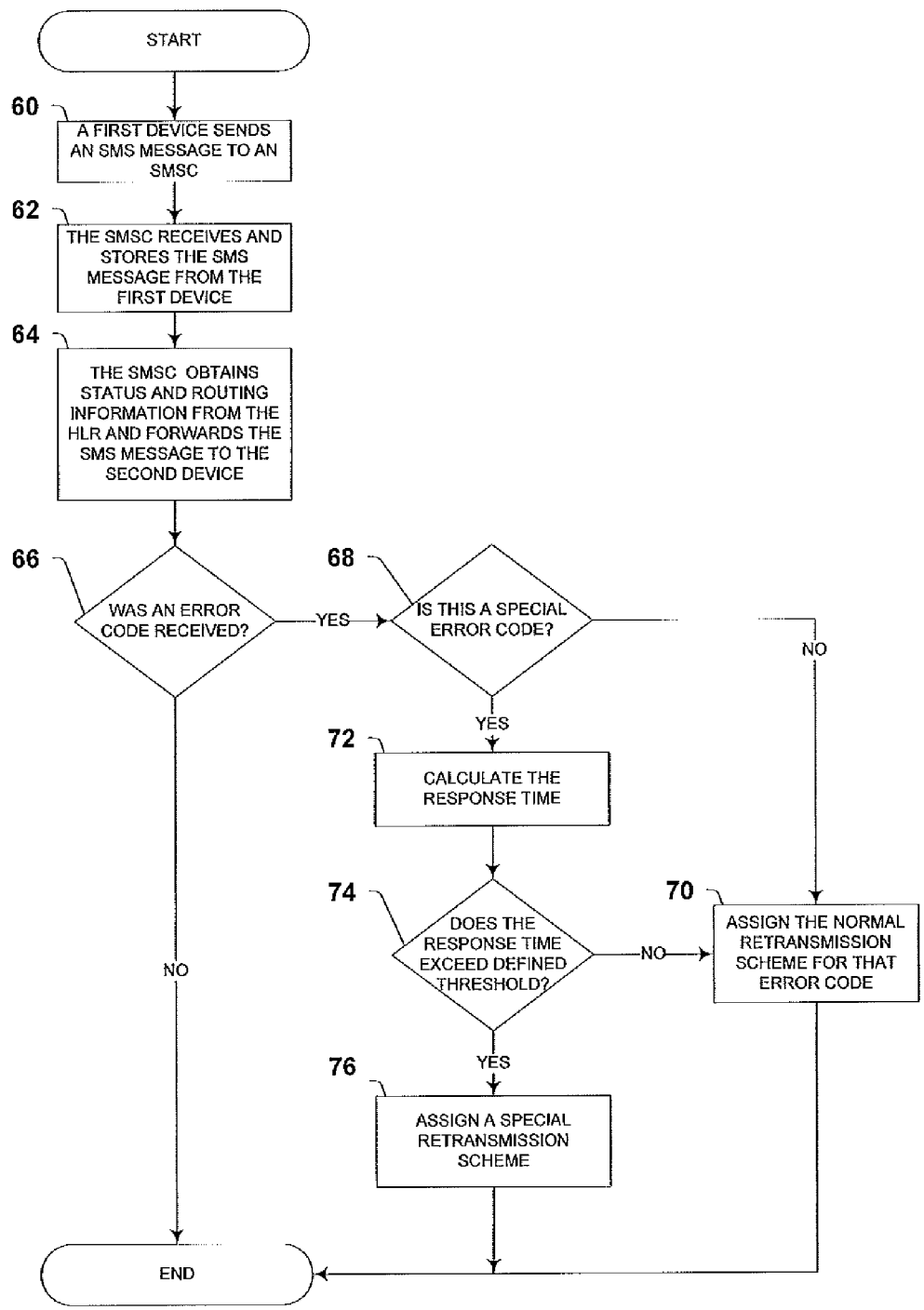
FIG. 3 schematically represents an exemplary method of determining an SMS retransmission schedule for an SMS message according to an exemplary embodiment of the present invention.

Referring additionally to FIG. 3, an exemplary method for assigning a special error code retransmission schedule to an undelivered SMS message is schematically illustrated. For purposes of simplifying the description, the illustrated exemplary method is illustrated with a mobile telephone 24 as a first SME ("sending device"), and a mobile telephone 24 as a second SME ("recipient device"). While the method is illustrated with only one recipient device, it should be understood that SMS messages can be substantially simultaneously sent to any number of recipient devices.

As illustrated in block 60, the illustrated exemplary method begins when a sending device sends an SMS message to a recipient device. The SMS message can be directed to an SMSC 50 on the network 10. As explained above, there can be any number of intervening devices between a mobile telephone 24 and the SMSC 50. Additionally, or in the alternative, the SMSC 50 can be software that utilizes hardware residing on another node of the network 10. Regardless of its physical characteristics, the SMSC 50 is generally configured to provide what is commonly referred to as "store-and-forward" functionality.

After receiving an SMS message, as illustrated in block 62, the SMSC 50 can store the received SMS message in a memory 54. The SMSC 50 can store the SMS message until the recipient device is located.

As illustrated in block 64, the SMSC 50 sends a query to the HLR 34 requesting operational status and location for the desired recipient device, The HLR 34 can provide the requested information to the SMSC 50. The response from the HLR 34 can indicate whether the recipient device is active or inactive, and if active, location information for the recipient device. If the recipient device is inactive, a retransmission schedule can be assigned to the SMS message (not illustrated). The SMSC 50 can interface with the HLR 34 to determine when the recipient device is back on-line, and the SMS message can be sent to the recipient device at that time. As mentioned above, there are several ways the SMSC 50 can interface with the HLR 34 to determine when the recipient device is available. For example, the HLR 34 can check for the recipient device periodically and notify the SMSC 50 when the recipient device is available. Alternatively, the SMSC 50 can periodically query the HLR 34 for status and location information relating to the recipient device. Alternatively, the HLR 34 can wait to receive information from the recipient device, for example, when the recipient device registers on the network 10, or the like. Other methods of locating the recipient device are contemplated, and included within the scope of the appended claims.

The remainder of the method schematically illustrated in FIG. 3 occurs after the SMSC 50 receives an "active" indication from the HLR 34, and receives location information relating to the recipient device. Once the recipient device is located, and the HLR forwards location information to the SMSC 50, the SMSC 50 can forward the SMS message to the recipient device, as illustrated at block 64. After forwarding the SMS message to the recipient device, the SMSC 50 can wait for a response from the recipient device. The response from the recipient device can indicate successful receipt of the SMS message, or the response can be an error code that informs the SMSC 50 that the SMS message was not received, and the reasons therefor. While there are many error codes available, the two most common error codes received are "absent subscriber" and "mobile memory capacity exceeded," as explained above. It should be noted that this method can be used to evaluate any error code, and not merely the several examples cited in this description.

As illustrated at block 66, the SMSC 50 will evaluate any response to determine if an error code was generated during delivery of the SMS message to the recipient device. If no error code was received, the SMSC 50 will not attempt to retransmit the message, and the process can end.

If, however, an error code is received by the SMSC 50, then the process will proceed to block 68. As illustrated at block 68, the SMSC 50 can evaluate the received error code to determine if the received error code can be classified as a special error code, though not necessarily using this terminology. Whether or not an error code is considered special can be determined by a network operator, by software, or the like.

For example, if an absent subscriber error was received, though the device is turned on and ready to receive messages, the "absent subscriber" error code can be defined as special, if desired. Therefore, if the SMSC 50 receives an "absent subscriber" error code, the SMSC 50 can evaluate the circumstances leading to the receipt of the error code, e.g., the response time, the device used, the network hardware involved, or the like, and determine whether the error code is genuine or faulty. It should be noted that any error code can be defined as special and that the use of an "absent subscriber" error code is not meant to limit the scope of the amended claims in any way. Instead, the example of an "absent subscriber" error code is employed merely for convenience and for ease of description.

If the error code is not determined to be a special error code, then the process can continue at block 70. At block 70, a retransmission schedule can be assigned for the SMS message. In the case of a non-special error code, the normal retransmission schedule for the received error code can be assigned to the SMS message, after which the process can end. If, however, the error code is determined to be a special error code, then the process can continue at block 72.

At block 72, the SMSC 50 can calculate the response time, i.e., the time that lapsed from the sending of the SMS message to the receipt of the error code. The response time can be calculated in any number of ways. For example, the SMSC 50 can begin tracking time elapsed when the SMS message is sent to the recipient device. Then, upon receipt of a response, the SMSC 50 can stop tracking the time elapsed. Alternatively, the SMSC 50 can generate a log of activity including time stamping. Then, when the SMSC 50 receives an error code for a particular SMS message, the SMSC processor 56 can calculate the time lapsed between the sending of the SMS message and the receipt of an error code. Other alternatives are contemplated, and many have advantages and disadvantages. As such, any method of calculating the response time can be employed according to the needs, preferences, or requirements of a network or network operator at any given time.

After calculating the response time, the process can continue with block 74. At block 74, the SMSC 50 can determine if the calculated response time exceeds a response time threshold for the received error code. The response time threshold can be set in any number of ways. For example, a device manufacturer can inform a network operator that a device tends to falsely generate a certain error code after a certain amount of time. Similarly, the network operator can determine that a certain error code is sometimes generated after a certain amount of time, due to the network, software, hardware, a particular device, combinations thereof, or the like.

Regardless of the cause of a faulty error code, when a tendency to generate faulty error codes is identified, the response time for the receipt of the possibly faulty error code can be calculated each time the error code is received. If the amount of time after which the false error codes are generated is more than the amount of time after which a genuine error code of the same type is generated, the response time threshold can be set such that a false error code can be readily recognized by the SMSC 50 when the response time for that error code exceeds a maximum response time threshold for that particular error code.

Similarly, a minimum response time threshold can be set and a false error code can be recognized if an error code response time is less than a recognized minimum threshold value. The response time can be any value including, but not limited to, 0.01 second, 1 second, three seconds, five seconds, ten seconds, 30 seconds or more.

If a special error code is received and the response time is not more or less than the defined maximum response time threshold or a defined minimum response time threshold, respectively, then the process can proceed to block 70. At block 70, as explained above, the normal retransmission schedule for the received error code is assigned and the process can end. If, however, the response time for the received error code can be more or less than the defined maximum response time threshold or a defined minimum response time threshold, respectively, then the error code may be a falsely generated error code, and the process can proceed to block 76.

At block 76, the SMSC 50 can assign a special retransmission schedule to the SMS message and again store the message back in an SMSC memory 54. The special retransmission schedule can be different from the normal retransmission schedule that would typically be assigned to the SMS message upon receipt of the received error code. For example, the special retransmission schedule can cause the SMSC 50 to make any number of changes to the retransmission schedule. Possible changes to the retransmission schedule include, but are not limited to, a different number of attempted retransmissions, a different frequency for attempted retransmissions, e.g. once every 5 seconds or once every 2 minutes, or the like, a different expiry time for the SMS message, not sending through a specific tower, BTS, BSC, a combination thereof, or the like. The changes to the retransmission schedule can attempt to make a successful delivery in a more timely manner than can be expected if the normal retransmission schedule is employed.

By substituting a special retransmission profile for a special error code received outside of an expected response time threshold, the SMSC 50 can reduce the number of undelivered SMS messages, thereby improving service and customer satisfaction. Additionally, the network operator can track falsely generated error codes and delivery of messages for billing purposes or for improvement purposes. Since SMS messages are typically billed on a per-message basis, a failed message due to a falsely generated error code can be reflected in billing. Similarly, if a certain device or network component appears to be causing falsely generated error codes, steps can be taken to correct the issue, thereby improving service and customer satisfaction.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, comprising:
receiving, by a computer processor, an error code associated with a short message service message transmitted;
determining, by the computer processor, whether the error code received is a special error code being of a predetermined type that is commonly falsely reported;
assigning, by the computer processor, if the error code received is not the special error code, a first retransmission schedule to the short message service message; and
determining, by the computer processor, if the error code received is the special error code, a time period that elapsed from when the short message service message was transmitted until the error code was received at the computer processor.

2. The method of claim 1, further comprising assigning, by the computer processor, if the error code received is the special error code, and if the time period determined is greater than a response time threshold, a second retransmission schedule to the short message service message.

3. The method of claim 2, further comprising assigning, by the computer processor, if the error code received is the special error code, and if the time period determined is not greater than the response time threshold, the first retransmission schedule to the short message service message.

4. The method of claim 1, further comprising assigning, by the computer processor, if the error code received is the special error code, and if the time period determined is not greater than the response time threshold, the first retransmission schedule to the short message service message.

5. The method of claim 1, further comprising storing, by the computer processor, in response to a determination that the special error code is of the predetermined type that is commonly falsely reported, data identifying the special error code.

6. The method of claim 1, further comprising transmitting, by the computer processor, the short message service message being addressed to a device.

7. The method of claim 6, wherein transmitting, by the computer processor, the short message service message addressed to the device includes transmitting, by the computer processor, the short message service message being addressed to a mobile communication device.

8. The method of claim 1, wherein the computer processor is a part of a short message service center.

9. A system, comprising:
a processor; and
a computer-readable medium being in operative communication with the processor and comprising computer-executable instructions that, when executed by the processor, cause the processor to perform operations comprising:
receiving an error code associated with a short message service message transmitted;
determining whether the error code received is a special error code being of a predetermined type that is commonly falsely reported;
assigning, if the error code received is not the special error code, a first retransmission schedule to the short message service message; and
determining, if the error code received is the special error code, a time period that elapsed from when the short message service message was transmitted until the error code was received.

10. The system of claim 9, wherein the system includes a short message service center node.

11. The system of claim 9, wherein the operations further comprise assigning, if the error code received is the special error code, and if the time period determined is greater than a response time threshold, a second retransmission schedule to the short message service message.

12. The system of claim 11, wherein the operations further comprise assigning, if the error code received is the special error code, and if the time period determined is not greater than the response time threshold, the first retransmission schedule to the short message service message.

13. The system of claim 9, wherein the operations further comprise assigning, if the error code received is the special error code, and if the time period determined is not greater than the response time threshold, the first retransmission schedule to the short message service message.

14. The system of claim 9, wherein the operations further comprise storing, in response to a determination that the special error code is of the predetermined type that is commonly falsely reported, data identifying the special error code.

15. A computer-readable storage device comprising computer-executable instructions that, when executed by a processor, cause the processor to perform operations comprising:
receiving an error code associated with a short message service message transmitted;
determining whether the error code received is a special error code being of a predetermined type that is commonly falsely reported;
assigning, if the error code received is not the special error code, a first retransmission schedule to the short message service message; and
determining, if the error code received is the special error code, a time period that elapsed from when the short message service message was transmitted until the error code was received.

16. The computer-readable storage device of claim 15, wherein the system includes a short message service center node.

17. The computer-readable storage device of claim 15, wherein the operations further comprise assigning, if the error code received is the special error code, and if the time period determined is greater than a response time threshold, a second retransmission schedule to the short message service message.

18. The computer-readable storage device of claim 17, wherein the operations further comprise assigning, if the error code received is the special error code, and if the time period determined is not greater than the response time threshold, the first retransmission schedule to the short message service message.

19. The computer-readable storage device of claim 15, wherein the operations further comprise assigning, if the error code received is the special error code, and if the time period determined is not greater than the response time threshold, the first retransmission schedule to the short message service message.

20. The computer-readable storage device of claim 15, wherein the operations further comprise storing, in response to a determination that the special error code is of the predetermined type that is commonly falsely reported, data identifying the special error code.

* * * * *